Oct. 31, 1967  NORIYUKI NAGAOKA  3,349,820
FEED CONTROL MECHANISM IN A ROTARY VENEER LATHE
Filed June 11, 1965
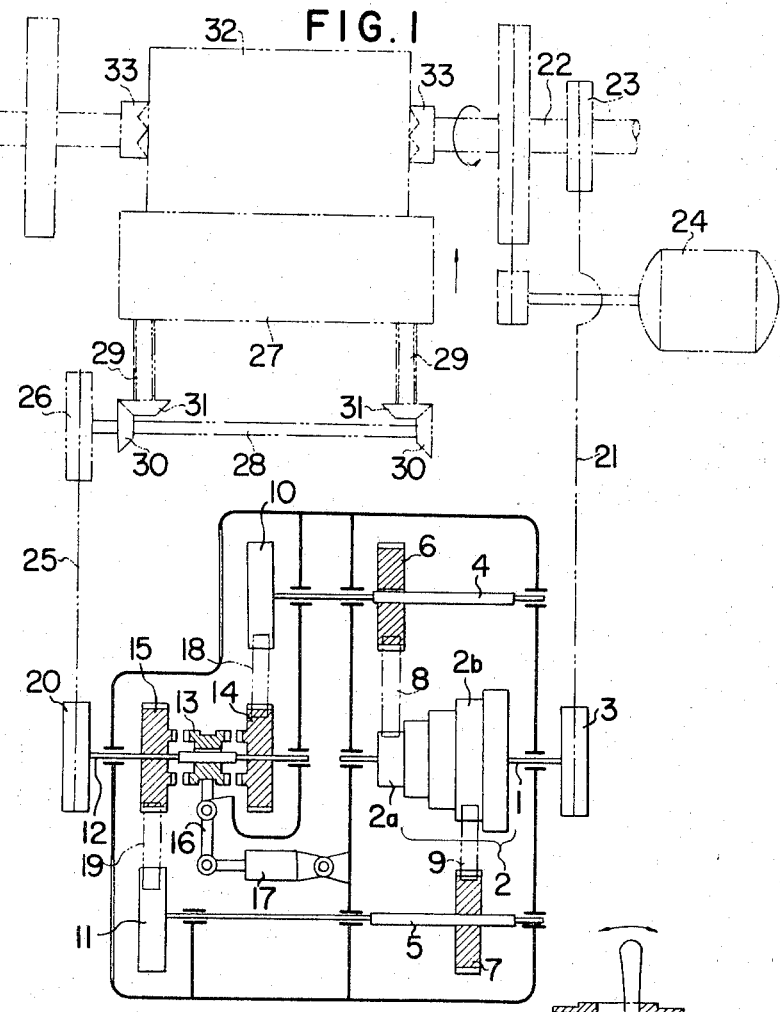
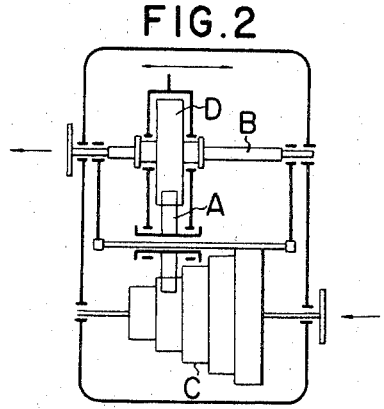
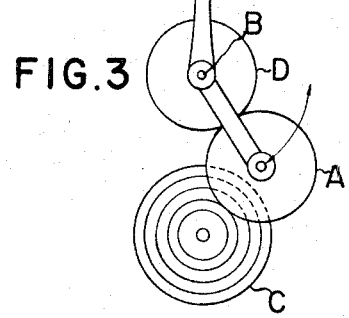

3,349,820
FEED CONTROL MECHANISM IN A ROTARY
VENEER LATHE
Noriyuki Nagaoka, Nagoya-shi, Japan, assignor to Kabushiki Kaisha Taihei Seisakusho, Minami-ku, Nagoya-shi, Aichi-ken, Japan, a joint-stock company
Filed June 11, 1965, Ser. No. 463,145
2 Claims. (Cl. 144—209)

ABSTRACT OF THE DISCLOSURE

A rotary veneer lathe having a lathe drive spindle, a cutting tool feeding mechanism and a feed control means in which a speed changing mechanism driven at a rotational speed proportional to the lathe spindle speed is capable of driving the input ends of at least two gear trains via intermediate gears capable of being meshed with any one of the gears of the speed changing mechanism so that each gear train can transmit power at various different speeds which differ from those of the other gear train and a controllable clutch for coupling selectively the output end of one of the gear trains to an output component for transmitting power at a selected speed to the cutting tool feeding mechanism.

---

This invention relates generally to feed control devices for machine tools, and more particularly to a new and improved feed control mechanism which, in a rotary veneer lathe, operates interrelatedly with the rotation of the workpiece log (or bolt) to cause the cutting tool (knife) to advance and cut the log to produce veneer of the specified thickness.

Known feed mechanisms in rotary veneer lathes have generally been of the so-called "cone-and-tumbler" or Norton type, which, as described more fully hereinafter, is troublesome in operation and is a hindrance to speeding up the operation of such lathes.

It is a general object of the present invention to provide, through improvement of a speed changing mechanism, a feed control mechanism of relatively simple construction for rotary veneer lathes capable of producing instantaneously and in a simple manner any desired feed rate of the cutting tool.

A further object of the invention is to provide a feed control mechanism whereby operational speeds of rotary veneer lathes can be substantially increased.

Briefly stated, the present invention resides in a feed control mechanism driven at its input side by power at a speed proportional to the drive spindle of a rotary veneer lathe and driving at its output side the cutting tool feed mechanism of the lathe, said feed control mechanism having at least two power transmission paths each with speed-change means to produce various speeds at the output side differing from those of the other transmission path and a controllable clutch device to couple selectively the output side of one of the transmission paths to the cutting tool feed mechanism.

The nature, principle, and details of the invention will be more clearly apparent from the following detailed description taken in conjunction with the accompanying drawings in which:

FIG. 1 is a schematic diagram showing the essential composition and arrangement of a preferred embodiment of the feed control mechanism according to the invention;

FIG. 2 is a diagrammatic view showing the essential composition and arrangement of a known speed change mechanism for controlling feed; and FIG. 3 is a simplified view, orthogonal relative to that of FIG. 2, showing only the gear mechanism and control lever.

Heretofore, a Norton type mechanism as illustrated in FIGS. 2 and 3 has been generally used as a feed control mechanism in veneer lathes. In this mechanism, the speed of the transmitted power is changed by manually causing an intermediate (tumbler) gear A meshed with a driven gear D to revolve about a driven shaft B so as to disengage from one of the stepped cone gears C constituting the driving side, causing the driven gear D and the intermediate gear A in their meshed state to shift axially, and then causing the intermediate gear A to mesh with the desired other gear of the stepped cone gears C.

Such an operation made necessary for this mechanism is troublesome and slow and presents a problem when speed-up of lathe operation is contemplated.

This difficulty has been overcome by the feed control mechanism according to the present invention described below with respect to a preferred embodiment thereof.

Referring to FIG. 1, the example of the feed control mechanism of the invention is shown in the lower part thereof, for the most part by full lines, while pertinent parts of the rotary veneer lathe in which the feed control mechanism is installed are shown by chain lines.

The feed control mechanism is provided on its input side with an input sprocket wheel 3 and a stepped or cone gear 2 both fixed to a stepped gear shaft 1. On driven shafts 4 and 5 which are rotatably supported in parallel relationship to the shaft 1, there are provided driven gears 6 and 7, respectively, which are freely slidable along their respective shafts in their axial directions but are adapted to rotate together with their respective shafts. Intermediate gears 8 and 9 permanently meshed with the driven gears 6 and 7, respectively, are so supported (by means not shown) that they can be rotated, in a meshed state with driven gears 6 and 7 about the axes of the shafts 4 and 5 into or out of engagement with any of the gears of the stepped gear 2. On the output ends of the driven shafts 4 and 5, there are fixed, respectively, change gears 10 and 11.

On the output side of the mechanism, there is provided a clutch shaft 12 parallel to and in axial alignment with the stepped gear shaft 1 and which supports a shiftable member 13 of a two-way dog clutch assembly. The shiftable member 13, which is provided with clutch teeth on both of its sides, is freely slidable along the clutch shaft 12 in its axial direction but is adapted to rotate together with the clutch shaft 12. This shiftable member 13 is slidably shifted along the clutch shaft 12 by a clutch shifter 16 actuated by a hydraulically operated piston-and-cylinder actuator 17.

Furthermore, the shiftable member 13 is so adapted that, when it is shifted by the clutch shifter 16, the clutch teeth on its side faces are engageable with either the side clutch teeth of a clutch gear 14 or the side clutch teeth of a clutch gear 15. The gears 14 and 15 are supported in a freely rotatable manner on the clutch shaft 12 on opposite sides of the shiftable member 13 but are prevented from shifting in the axial direction, thereby constituting, together with the shiftable member 13, the aforementioned two-way dog clutch assembly.

Intermediate gears 18 and 19 permanently meshed with the peripheral gear teeth of clutch gears 14 and 15, respectively, are so supported (by means not shown) that they can be manually rotated, in a meshed state with clutch gears 14 and 15, about the axis of the clutch shaft 12 into or out of engagement with the aforementioned change gears 10 and 11, whereby the power transmission path can be readily switched between the change gears 10 and 11. An output sprocket wheel 20 is fixed to the output end of the clutch shaft 12.

The numbers of teeth of the gear train consisting of gears 8, 6, 10, 18, and 14 and the gear train consisting of gears 9, 7, 11, 19, and 15 are so selected that the speed changes obtainable from one gear train differ from those obtainable from the other gear train. Accordingly, the combination of the two gear trains affords an extremely wide range of selectable speed changes.

The input sprocket 3 of the above described feed control mechanism is coupled by a sprocket chain 21 to a driving sprocket 23 fixed to the lathe center drive spindle 22 which is driven in the direction indicated by an arrow by a motor 24, whereby the stepped gear shaft 1 and the stepped cone gear 2 are rotated.

The output power of the above described feed control mechanism is transmitted from the clutch shaft 12 through the output sprocket 20, a sprocket chain 25, and a driven sprocket 26 to drive a shaft 28 which is parallel to a cutting tool assembly 27, which confronts a log (or bolt) 32 center on the lathe and held by chuck claws 33 of the lathe center, at least one of which is driven by the lathe center drive spindle 22.

The cutting tool assembly 27 is caused to advance toward or retreat from the log 32 by the rotation of the shaft 28 transmitted by bevel gears 30 and 31 to feed shafts 29.

The feed control mechanism as described above operates in the following manner. When the hydraulic piston-and-cylinder actuator 17 is activated to cause the shiftable member 13 to engage with either of the dog clutch gears 14 and 15, the rotation of the dog clutch gear so engaged is transmitted through the shiftable member 13 and clutch shaft 12 to the output sprocket 20.

Accordingly, when the shiftable member 13 is engaged with the clutch gear 14, and the intermediate gear 8 is engaged with a small diameter gear 2a of the stepped cone gear 2, the power is reduced in speed and transmitted to the output sprocket 20.

In order to obtain output rotational speeds other than that obtained as described above, the meshing of the intermediate gears 8 and 9 with the stepped cone gear 2 is separately selected which cannot be obtained by means of the stepped cone gear 2 will be necessary, the change gears 10 and 11 are replaced by those having suitable numbers of teeth.

Thus, the input sprocket 3 is caused to rotate by the rotation of the lathe drive shaft 22, and the output sprocket 20 determines the feed rate of the cutting tool 27. Accordingly, the feed rate of the cutting tool 27 appropriately corresponding to the log 32 is constantly obtained.

During the rotary cutting of veneer from a single log, there are frequent instances when, because of the out-of-round shape of the log, the presence of defects, splits, and other reasons, it is necessary to cut selectively parts suitable for core material and parts suitable for face material. In such instances, the feed control mechanism according to the present invention is highly effective and advantageous in that it affords, by the operation of the hydraulic piston-and-cylinder actuator 17, instantaneously changing of the knife feed rate thereby to cut veneer of the desired thickness. Accordingly, by installing the feed control device of the invention in combination with devices readily adaptable to speed-up of production, such as veneer take-up and unrolling devices and veneer shearing devices, it is possible to increase greatly the efficiency of veneer cutting work.

Therefore, the present invention affords a substantial economic advantage not only in improving the performances of rotary veneer lathes but also in contributing high efficiency to the plywood manufacturing industry.

It will be apparent to those skilled in the art that various changes can be made in the above described details. For example, the above described stepped cone gear 2 may be replaced by other suitable speed-change mechanisms, and the dog-clutch assembly may be replaced by a device such as an electromagnetic coupling. Furthermore, instead of the combination of the clutch shifter and the hydraulic piston actuator described above, another suitable mechanism may be used.

Accordingly, it should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What I claim is:

1. In a rotary veneer lathe having a lathe drive spindle, a cutting tool feed mechanism and a feed control means therefor, said feed control means including an input shaft, a drive connection between the input shaft and the lathe drive spindle for driving the input shaft at a rotational speed proportional to the lathe drive spindle speed, a multiple-gear cone on the input shaft, a clutch shaft spaced from and in axial alignment with the input shaft, a drive connection between the clutch shaft and the cutting tool feed mechanism, and at least two gear trains operably associated with the input shaft and the clutch shaft, each gear train comprising a shaft parallel to the input and clutch shafts, a driven gear rotatable with but axially slidable along the shaft, an intermediate gear in mesh with the driven gear and movable into and out of engagement with any of the gears of the multiple-gear cone, a change gear on the output end of the shaft, a member rotatable with but axially shiftable along the clutch shaft, clutch gears freely rotatable but nonaxially displaceable on the clutch shaft on opposite sides of the member, said member and clutch gears having complementary clutching surfaces, an intermediate gear in mesh with each clutch gear and movable into and out of engagement with a change gear, and a hydraulically operated piston and cylinder actuator connected to said member to shift the member along the clutch shaft to engage its clutching surface with the clutching surface of one of the clutch gears to transmit the drive of the selected gear train to the cutting tool feed mechanism.

2. In a rotary veneer lathe having a lathe drive spindle, a cutting tool feed mechanism and a feed control means therefor, said feed control means including an input shaft, a drive connection between the input shaft and the lathe drive spindle for driving the input shaft at a rotational speed proportional to the lathe drive spindle speed, a multiple-speed changing mechanism carried by the input shaft, a clutch shaft spaced from and in axial alignment with the input shaft, a drive connection between the clutch shaft and the cutting tool feed mechanism, and at least two gear trains operably associated with the input shaft and the clutch shaft, each gear train comprising a shaft parallel to the input and clutch shafts, a driven gear rotatable with but axially slidable along the shaft, an intermediate gear in mesh with the driven gear and movable into and out of engagement with any of the gears of the speed changing mechanism, a change gear on the output end, a pair of axially spaced clutch gears freely rotatable but nonaxially displaceable on the clutch shaft, coupling means rotatable with but movable axially on the clutch shaft between the clutch gears, an intermediate gear in mesh with each clutch gear and movable into and out of engagement with a change gear, and means for actuating the coupling means to couple one of the clutch gears to the clutch shaft to transmit the drive of the selected gear train to the cutting tool feed mechanism.

References Cited

UNITED STATES PATENTS 942,105    12/1909    Rounds _____ 144—209

FOREIGN PATENTS 105,906    3/1927    Austria.

DONALD R. SCHRAN, *Primary Examiner.*